United States Patent
Baek

(10) Patent No.: US 10,895,945 B2
(45) Date of Patent: Jan. 19, 2021

(54) TOUCH SENSOR AND TOUCH DISPLAY DEVICE HAVING THE SAME

(71) Applicant: Samsung Display Co., Ltd., Yongin-si (KR)

(72) Inventor: Seung Ho Baek, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 36 days.

(21) Appl. No.: 16/007,828

(22) Filed: Jun. 13, 2018

(65) Prior Publication Data

US 2019/0179461 A1 Jun. 13, 2019

(30) Foreign Application Priority Data

Dec. 11, 2017 (KR) .......................... 10-2017-0169443

(51) Int. Cl.
*G06F 3/047* (2006.01)
*G06F 3/044* (2006.01)

(52) U.S. Cl.
CPC ............ *G06F 3/047* (2013.01); *G06F 3/0443* (2019.05); *G06F 3/0446* (2019.05); *G06F 2203/04103* (2013.01); *G06F 2203/04107* (2013.01); *G06F 2203/04112* (2013.01)

(58) Field of Classification Search
CPC combination set(s) only.
See application file for complete search history.

(56) References Cited

U.S. PATENT DOCUMENTS

| | | | |
|---|---|---|---|
| 9,081,453 B2 | 7/2015 | Bulea et al. | |
| 9,851,858 B2 | 12/2017 | Lee | |
| 2011/0221700 A1* | 9/2011 | Mo | ........................ G06F 3/044 |
| | | | 345/174 |
| 2015/0116261 A1 | 4/2015 | Ahn | |
| 2016/0357336 A1 | 12/2016 | Jeong et al. | |
| 2017/0010714 A1 | 1/2017 | Lee | |
| 2017/0185202 A1* | 6/2017 | Qu | ...................... G02F 1/13338 |
| 2017/0199594 A1* | 7/2017 | Lee | .......................... G06F 3/044 |
| 2017/0338287 A1* | 11/2017 | Ito | ............................ G06F 3/044 |
| 2017/0344187 A1* | 11/2017 | Ko | ........................ G06F 3/0418 |

FOREIGN PATENT DOCUMENTS

KR    10-1482931 B1    1/2015
KR    10-2016-0088546 A    7/2016

* cited by examiner

*Primary Examiner* — Robin J Mishler
(74) *Attorney, Agent, or Firm* — Lewis Roca Rothgerber Christie LLP

(57) ABSTRACT

A touch sensor includes: a plurality of sensor electrodes formed in a touch active region to form a plurality of sensor patterns; a plurality of sensor lines coupled to the respective sensor electrodes; a touch driver at one side of the touch active region, the touch driver being electrically coupled to the sensor electrodes respectively through the sensor lines; and dummy electrodes respectively arranged at one sides of the sensor electrodes, corresponding to the sensor lines.

15 Claims, 13 Drawing Sheets

TOUCH SENSOR AND TOUCH DISPLAY DEVICE HAVING THE SAME

CROSS-REFERENCE TO RELATED APPLICATION

This application claims priority to and the benefit of Korean patent application 10-2017-0169443 filed on Dec. 11, 2017 in the Korean Intellectual Property Office, the entire disclosure of which is incorporated herein by reference.

BACKGROUND

1. Field

Aspects of some example embodiments relate to a display device.

2. Related Art

A touch sensor is an information input device, and may be provided and used in a display device. For example, the touch sensor may be attached to one surface of a display panel or be integrally formed with the display panel. A user may input information by pressing or touching the touch sensor while viewing an image displayed on a screen of a touch display device.

The above information discussed in this Background section is only for enhancement of understanding of the background of the described technology and therefore it may contain information that does not constitute prior art.

SUMMARY

Aspects of some example embodiments include a touch sensor including dummy electrodes respectively arranged at one sides of sensor electrodes.

Aspects of some example embodiments include a touch sensor including dummy lines arranged at one sides of sensor electrodes with different sizes according to distances from a touch driver.

Aspects of some example embodiments include a touch display device including the touch sensor.

According to some example embodiments, a touch sensor includes: a plurality of sensor electrodes formed in a touch active region as a sensor pattern is repeatedly arranged; a plurality of sensor lines coupled to the respective sensor electrodes; a touch driver disposed at one side of the touch active region, the touch driver being electrically coupled to the sensor electrodes respectively through the sensor lines; and dummy electrodes respectively arranged at one sides of the sensor electrodes, corresponding to the sensor lines.

Each of the dummy electrodes may have a pattern corresponding to the shape of the sensor pattern.

Each of the sensor lines may include: a first line part extending in a first direction from each of the sensor electrodes; and a second line part extending in a second direction vertical to the first direction from one end of the first line part to be coupled to the touch driver. The length of the first line part may become shorter as it becomes more adjacent to the touch driver along the second direction.

Each of the dummy electrodes may be configured with at least one dummy pattern disposed at least one of upper and lower sides of the first line part.

The sensor pattern may have a rhombus shape. The at least one dummy pattern may include: upper dummy patterns disposed at the upper side of the first line part; and lower dummy patterns disposed at the lower side of the first line part, corresponding to the respective upper dummy patterns The upper dummy pattern may correspond to an isosceles triangular shape obtained by cutting the center of the sensor pattern in the first direction. A second upper dummy pattern adjacent to a first upper dummy pattern may have a shape obtained as the first upper dummy pattern is rotated by 180 degrees.

The upper dummy patterns may have a shape symmetrical to the upper dummy pattern corresponding to the lower dummy pattern with respect to the first line part.

The number of upper dummy patterns and lower dummy patterns may be decreased for every preset distance as they become more adjacent to the touch driver along the second direction.

The size of the sensor electrodes may become smaller as they become more adjacent to the touch driver along the second direction.

The size of the sensor pattern may become smaller as it becomes more adjacent to the touch driver along the second direction.

The sensor pattern and the sensor lines may be formed by repeatedly patterning a conductive material into a plurality of fine patterns.

The sensor pattern and the sensor lines may be formed of a transparent conductive material.

The sensor pattern and the sensor lines may have a mesh shape in which a plurality of openings are defined.

The touch sensor may further include a shielding electrode disposed between the sensor electrodes, the shielding electrode blocking electrical influence between adjacent sensor electrodes.

The shielding electrode may include a conductive material, and a constant voltage may be applied to the shielding electrode, or the shielding electrode may have a floated state.

According to some example embodiments, a touch sensor includes: a plurality of sensor electrodes formed in a touch active region as a sensor pattern is repeatedly arranged; a plurality of sensor lines coupled to the respective sensor electrodes; and a touch driver disposed at one side of the touch active region, the touch driver being electrically coupled to the sensor electrodes respectively through the sensor lines, wherein each of the sensor lines includes: a first line part extending in a first direction from each of the sensor electrodes; a second line part extending in a second direction vertical to the first direction from one end of the first line part to be coupled to the touch driver; and a dummy line part coupled between a first point of the first line part and a second point of the second line part, the dummy line part extending to the one end of the first line part along the first direction from the first point, the dummy line part having a width in the second direction, which is increased from the first point to the one end of the first line part, wherein, as the sensor lines become more adjacent to the touch driver along the second direction, the area of the dummy line part corresponding to each of the sensor lines becomes smaller.

One side of the dummy line part, which is inclined with respect to the first line part, may have the same slope for each of the sensor lines.

The sensor pattern and the sensor lines may have a mesh shape in which a plurality of openings are defined.

The touch sensor may further include dummy electrodes disposed corresponding to each of the first line parts. The number of dummy electrodes may be decreased as they become more adjacent to the touch driver along the second direction.

According to some example embodiments, a touch display device includes: a touch sensor recognizing a touch, based on a touch capacitance generated by an approach or touch of a touch means (or touch object, e.g., a finger or stylus); and a display panel combined with the touch sensor, wherein the touch sensor includes: a plurality of sensor electrodes formed in a touch active region as a sensor pattern is repeatedly arranged; a plurality of sensor lines coupled to the respective sensor electrodes; a touch driver disposed at one side of the touch active region, the touch driver being electrically coupled to the sensor electrodes respectively through the sensor lines; and a dummy electrode including at least one dummy pattern respectively arranged at one sides of the sensor electrodes, corresponding to the sensor lines, wherein the number of dummy patterns is decreased as they become more adjacent to the touch driver.

In the touch sensor and a touch display device including the same according to some example embodiments, the area (or size) of at least one of the dummy electrode and the dummy line, which are arranged at one side of the sensor electrode may be changed depending on the distance from the touch driver, so that the difference in reflexibility between the sensor electrode and a peripheral region thereof can be reduced. Thus, the reflexibilities between the sensor electrodes and peripheral regions thereof can be maintained to similar levels. Accordingly, a display defect such as a spot due to a difference in reflexibility in the touch active region can be prevented or reduced, and the visibility of the touch sensor can be improved.

BRIEF DESCRIPTION OF THE DRAWINGS

Aspects of some example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
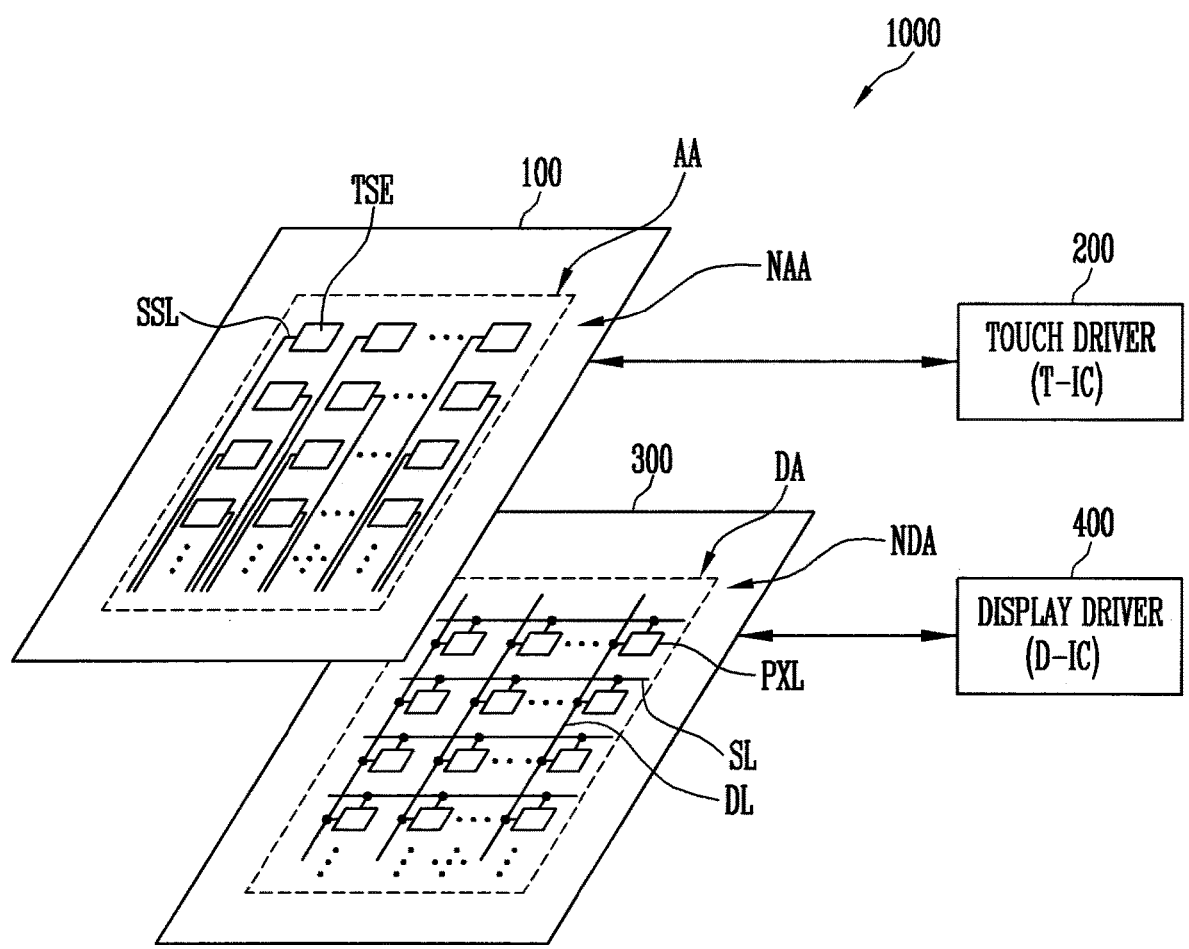
FIG. 1 is a view illustrating a touch display device according to some example embodiments of the present invention.

Aspects of some example embodiments relate to a display device, for example, a touch display device and a touch sensor applied thereto.

Hereinafter, aspects of some exemplary embodiments of the present disclosure will be described in more detail with reference to the accompanying drawings. Throughout the drawings, the same reference numerals are given to the same elements, and their overlapping descriptions will be omitted.

FIG. 1 is a view illustrating a touch display device according to some example embodiments of the present invention.

Referring to FIG. 1, the touch display device 1000 includes a sensor unit 100, a touch driver 200, a display panel 300, and a display driver 400. The sensor unit 100 and the touch driver 200 constitute a touch sensor.

Meanwhile, in the embodiment of FIG. 1, it is illustrated that the sensor unit 100 and the display panel 300 are separated from each other, but embodiments of the present disclosure are not limited thereto. For example, the sensor unit 100 and the display panel 300 may be integrally manufactured.

In some embodiments, the sensor unit 100 may be provided on at least one region of the display panel 300. For example, the sensor unit 100 may be provided on at least one surface of the display panel 300 to overlap with the display panel 300. As an example, the sensor unit 100 may be arranged on one surface (e.g., an upper surface) in the direction in which an image is emitted between both surfaces of the display panel 300 or a back surface (e.g., a lower surface) of the display panel 300. In another embodiment, the sensor unit 100 may be directly formed on at least one surface between both the surfaces of the display panel 300 or be formed at the inside of the display panel 300. For example, the sensor unit 100 may be directly formed on an outer surface of an upper substrate or a lower substrate (e.g., an upper surface of the upper substrate or a lower surface of the lower substrate) or an inner surface of the upper substrate or the lower substrate (e.g., a lower surface of the upper substrate or an upper surface of the lower substrate).

The sensor unit 100 includes a touch active region AA capable of sensing a touch input and a non-active region NAA surrounding at least a portion of the touch active region AA. In some embodiments, the touch active region AA may be disposed to correspond to a display region DA of the display panel 300, and the non-active region NAA may be disposed to correspond to a non-display region NDA of the display panel 300. For example, the touch active region AA of the sensor unit 100 may overlap with the display region DA of the display panel 300, and the non-active region NAA of the sensor unit 100 may overlap with the non-display region NDA of the display panel 300.

In some embodiments, a plurality of sensor electrodes TSE for detecting a touch input may be distributed and arranged in the touch active region AA. That is, the sensor electrodes TSE may be provided on the display region of the display panel 300. In this case, at least some of the sensor electrodes TSE may overlap with at least one electrode provided in the display panel 300. For example, when the display panel 300 is an organic light emitting display panel or a liquid crystal display panel, the sensor electrodes TSE may overlap with at least one cathode electrode or a common electrode.

In some embodiments, the touch sensor may be a self-capacitive touch sensor. Each of the sensor electrodes TSE has a reference potential, e.g., a self-capacitance with respect to a ground potential. Sensor lines SSL are coupled to the sensor electrodes TSE. The sensor electrodes TSE are coupled to the touch driver 200 through the sensor lines SSL and an interface. In the embodiments of the present disclosure, the "coupling" may comprehensively mean "coupling" in physical and/or electrical aspects. Meanwhile, this is merely illustrative, and the touch recognition method of the touch sensor is not limited thereto.

In some embodiments, the sensor electrodes TSE may be distributed in the touch active region AA to detect the position of a touch input when the touch input occurs in the touch active region AA. For example, the sensor electrodes TSE may be distributed in a matrix form at positions respectively corresponding to coordinates (e.g., two-dimensional XY coordinates) defined with a density (e.g., a predetermined density) or resolution in the touch active region AA. Alternatively, in an embodiment, the sensor electrodes TSE may extend in a first direction (e.g., an X direction) and a second direction (e.g., a Y direction). In this case, the occurrence of a touch input and the position of the touch input may be detected by synthesizing changes in self-capacitances of the sensor electrodes TSE extending in the first direction and the second direction.

The sensor lines SSL are coupled to the respective sensor electrode TSE. A predetermined driving signal may be applied to the sensor electrode TSE through the sensor line SSL. In addition, a change in capacitance generated in the sensor electrode TSE may be detected through the sensor line SSL.

The touch driver 200 may be electrically coupled to the sensor unit 100 to drive and sense the sensor unit 100. For example, the touch driver 200 may detect a touch input by supplying a driving signal to the sensor unit 100 and then receiving a sensing signal corresponding to the driving signal from the sensor unit 100. In some embodiment, the touch driver 200 may include a plurality of sensing channels coupled to the respective sensor electrodes TSE. For example, the touch driver 200 may include a plurality of sensing channels coupled one-to-one to the sensor electrodes TSE. Also, the touch driver 200 may include a processor for receiving output signals of the sensing channels and detecting a touch input, based on the output signals. In some embodiments, the sensing channels and the processor may be integrated in one touch IC (T-IC), but the present disclosure is not limited thereto.

The display panel 300 includes the display region DA and the non-display region NDA surrounding at least one region of the display region DA. The display region DA may be provided with a plurality of scan lines SL, a plurality of data lines DL, and a plurality of pixels PXL coupled to the scan lines SL and the data line DL. The non-display region NDA may be provided with various types of driving signals for driving the pixels PXL and/or lines for supplying a driving power source.

In the present disclosure, the kind of the display panel 300 is not particularly limited. For example, the display panel 300 may be a self-luminescent display panel such as an organic light emitting display panel (OLED panel). Alternatively, the display panel 300 may be a non-luminescent display panel such as a liquid crystal display panel (LCD panel), an electrophoretic display panel (EDP panel), or an electro-wetting display panel (EWD panel). When the display panel 300 is a non-luminescent display panel, the display device may further include a backlight unit for supplying light to the display panel 300.

The display driver 400 may be electrically coupled to the display panel 300 to supply signals required to drive the display panel 300. For example, the display driver 400 may include at least one of a scan driver for supplying a scan signal to the scan lines SL, a data driver for supplying a data signal to the data lines DL, and a timing controller for driving the scan driver and the data driver. In some embodiments, the scan driver, the data driver, and/or the timing controller may be integrated in one display IC (D-IC), but the present disclosure is not limited thereto. For example, in another embodiment, at least one of the scan driver, the data driver, and the timing controller may be integrated or mounted on the display panel 300.

Figure 2:
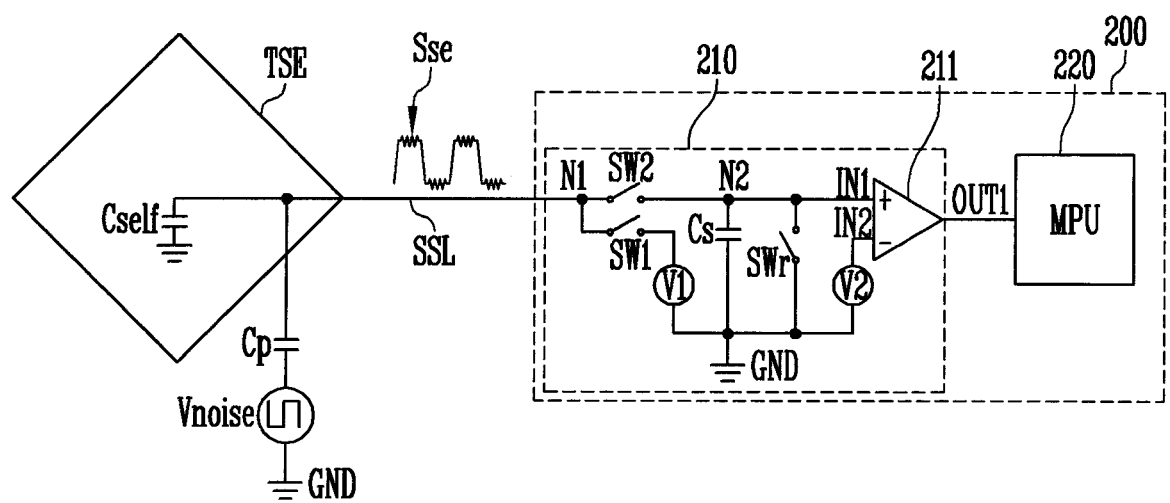
FIG. 2 is a view illustrating an example of a touch sensor included in the touch display device of FIG. 1.

FIG. 2 is a view illustrating an embodiment of the sensor electrode and the sensing channel coupled thereto in the touch display device of FIG. 1. For convenience, only one sensor electrode and one sensing channel coupled thereto are illustrated in FIG. 2.

Referring to FIG. 2, each sensor electrode TSE has a self-capacitor Cself with respect to, for example, a ground GND. The sensor electrode TSE may be coupled to the touch driver 200 through a sensor line SSL.

In an embodiment, the sensor electrode TSE may have the self-capacitor Cself with respect to a common voltage applied to a cathode electrode of a pixel. However, this is merely illustrative, and a separate electrode for forming the self-capacitor Cself of the sensor electrode TSE may be provided.

In some embodiments, the touch driver 200 may include each sensing channel 210 coupled to each sensor electrode TSE and a processor 220 for detecting a touch input by receiving an output signal of the sensing channel 210. Meanwhile, the sensor unit 100 may include a plurality of sensor electrodes TSE as described above, and thus a plurality of sensing channels 210 coupled to the respective sensor electrodes TSE are provided in the touch driver 200. The processor 220 receives signals output from the plurality of sensing channels 210, and detects a touch input, based on the output signals.

Each sensing channel 210 may include a first voltage source V1 for supplying a driving signal to the sensor electrode TSE and a first amplifier 211 for amplifying and output a sensing signal Sse input from the sensor electrode TSE. Also, the sensing channel 210 may include first and second switches SW1 and SW2 for selectively coupling the sensor electrode TSE to the first voltage source V1 or the first amplifier 211.

In an embodiment, the first voltage source V1 may be a driving voltage source for supplying a predetermined driving signal to the sensor electrode TSE. For example, the first voltage source V1 may be an AC voltage source for supplying a pulse wave. In some embodiments, the first switch SW1 may be turned on for a first period to couple the first voltage source V1 to a first node N1. Therefore, if the first switch SW1 is turned on, the driving signal may be supplied to the sensor electrode TSE.

In some embodiments, a second voltage source V2 may be a reference voltage source (or a comparison voltage source) for amplifying and outputting the sensing signal Sse, and be coupled between a second input terminal IN2 and the ground GND. In the embodiment shown in FIG. 2, the first amplifier 211 may be operated as a comparator. That is, the first amplifier 211 may output a signal corresponding to the difference between a voltage of a first input terminal IN1 and a voltage of the second input terminal IN2.

In some embodiments, the first and second switches SW1 and SW2 may be turned on at different times. For example, the first switch SW1 may be turned on during the first period, and the second switch SW2 may be turned on during a second period subsequent to the first period. In addition, the first period and the second period may be alternately repeated during a period in which the touch sensor is activated.

If the first switch SW1 is turned on during the first period, the first voltage source V1 may be coupled to the sensor electrode TSE via the first node N1 and the sensor line SSL. Accordingly, the driving signal may be supplied from the voltage source V1 to the sensor electrode TSE.

Subsequently, during the second period, the first switch SW1 is turned off and the second switch SW2 is turned on, so that the first node N1 and a second node N2 are coupled to each other. Accordingly, as charge sharing occurs, a voltage corresponding to the sensing signal Sse may be stored in a capacitor Cs provided in each sensing channel 210. At this time, because the first input terminal IN1 of the first amplifier 211 is coupled to the second node N2, the first amplifier 211 outputs a voltage corresponding to the difference between a voltage of the second node N2 and the voltage of the second voltage source V2. That is, during the second period, each sensing channel 210 amplifies and outputs the sensing signal Sse with respect to the potential of the second voltage source V2. Meanwhile, a reset switch SWr is turned on for every predetermined reset period. If the reset switch SWr is turned on, the capacitor Cs is discharged and reset.

As described above, each sensing channel 210 supplies a driving signal to the sensor electrode TSE during the first period and receives a sensing signal Sse from the sensor electrode TSE during the second period, thereby generating an output signal corresponding to the sensing signal Sse. Then, the processor 220 detects a touch input, based on the output signal of the sensing channel 210.

Figure 3:
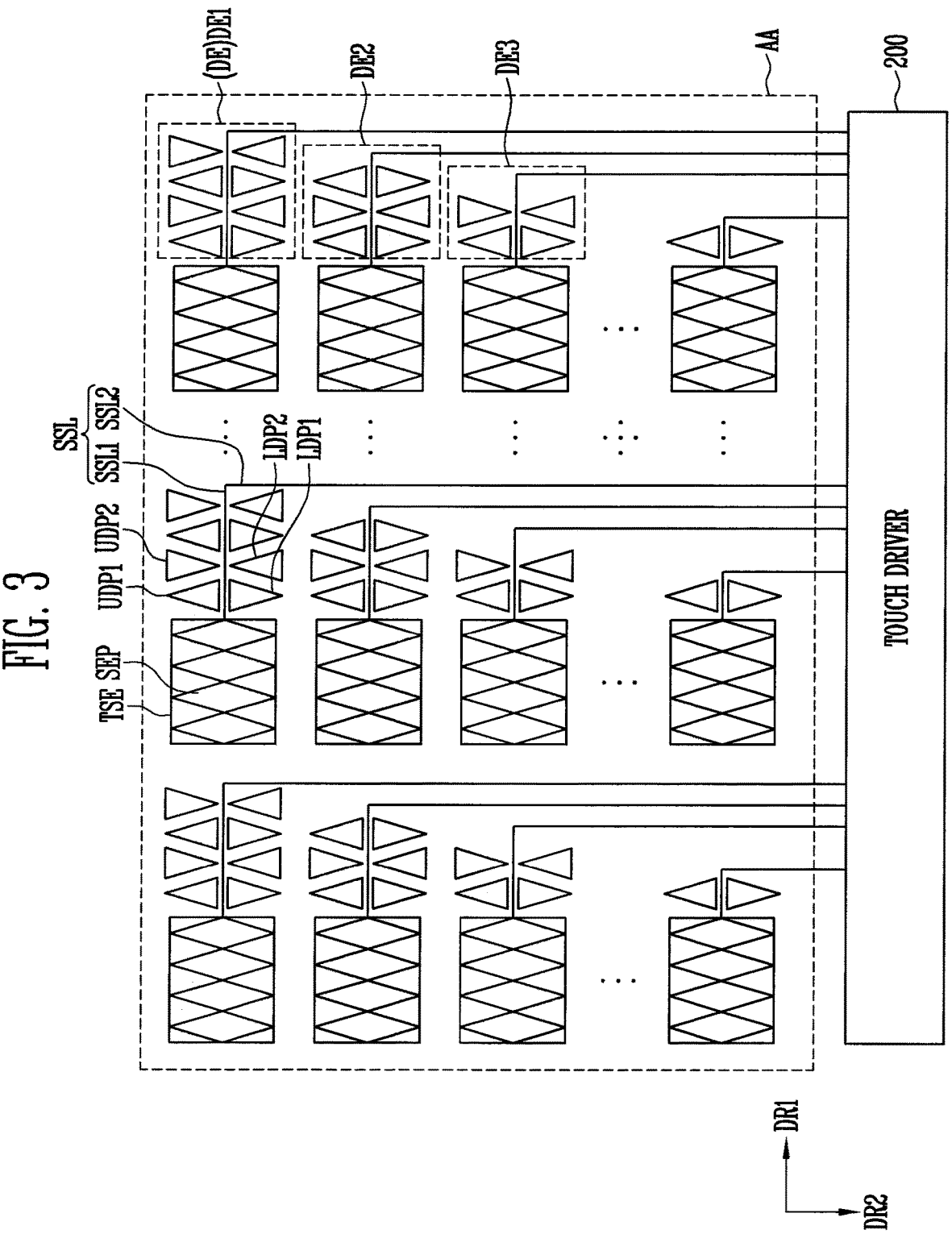
FIG. 3 is a plan view illustrating a touch sensor according to some example embodiments of the present invention.

FIG. 3 is a plan view illustrating a touch sensor according to embodiments of the present disclosure.

Referring to FIG. 3, the touch sensor may include a plurality of sensor electrodes TSE, a plurality of sensor lines SSL, a plurality of dummy electrodes DE, and a touch driver 200.

In some embodiments, the sensor electrodes TSE, the sensor lines SSL, and the plurality of dummy electrodes DE are disposed on a thin film encapsulation of the display panel, and include a conductive material. For example, the thin film encapsulation may have a structure in which at least one organic layer and at least one inorganic layer are alternately stacked.

The sensor electrodes TSE may be formed in a touch active region AA as a sensor pattern SEP is repeatedly arranged to form a plurality of sensor patterns SEPs. In an embodiment, the sensor pattern SEP may have a rhombus shape or a diamond shape. The sensor electrode TSE may have a form in which the sensor pattern SEP having the rhombus shape is repeatedly arranged in a first direction DR1 (e.g., a vertical direction). In some embodiments, the sensor electrode TSE may be configured such that the sensor patterns SEP having the rhombus shape, which are arranged in the first direction DR1, are arranged to be engaged with each other while forming a plurality of rows.

The sensor pattern SEP may be formed by repeatedly patterning a conductive material into a plurality of fine patterns. For example, each side of a rhombus of the sensor pattern SEP may be a closed loop region obtained by coupling at least one repeatedly patterned fine pattern. For example, each side of the rhombus of the sensor pattern SEP is not smooth and may have a zigzag shape. Accordingly, the sensor pattern SEP may have a mesh shape in which a plurality of openings are defined. Here, the mesh shape may be implemented with a quadrangular pattern, a hexagonal pattern, a circular pattern, or the like. Thus, the opening ratio of the touch active region AA can be increased.

However, this is merely illustrative, and the shape of the sensor pattern SEP, the shape of the sensor electrode TSE, and the number and shape of sensor patterns SEP included in the sensor electrode TSE are not limited thereto.

In an embodiment, the sensor pattern SEP and the sensor electrode TSE may include a transparent conductive material. For example, the sensor pattern SEP and the sensor electrode TSE may include indium tin oxide (ITO), indium zinc oxide (IZO), zinc oxide (ZnO), indium tin zinc oxide (ITZO), PEDOT, metal nano wire, and graphene.

In another embodiment, the sensor pattern SEP and the sensor electrode TSE may have a metal conductive layer. For example, the sensor pattern SEP and the sensor electrode TSE may include at least one selected from the group consisting of molybdenum, silver, titanium, copper, aluminum, and any alloy of two or more thereof. For example, the conductive layer may be configured with an alloy of titanium and aluminum.

The sensor pattern SEP and the sensor electrode TSE may have a single- or multi-layered structure. The multi-layered structure may be formed in a structure in which a transparent conductive layer made of the transparent conductive material and at least one metal conductive layer are stacked.

The sensor lines SSL may be coupled to the respective sensor electrodes TSE. In a self-capacitive touch sensor, the sensor lines SSL may correspond one-to-one to the sensor electrodes TES. The sensor line SSL may electrically couple the sensor electrode TSE to the touch driver 200, and transfer a sensing signal generated from the sensor electrode TSE to the touch driver 200.

In an embodiment, the sensor line SSL may include a first line part SSL1 extending in the first direction DR1 and a second line part SSL2 extending in a second direction DR2 from one end of the first line part SSL1 to be coupled to the touch driver 200. Here, the second direction DR2 may be a direction substantially vertical to the first direction DR1. For example, the first direction DR1 may be a horizontal direction corresponding to pixel rows, and the second direction DR2 may be a vertical direction corresponding to pixel columns.

Here, the length of the first line part SSL may become shorter as it becomes more adjacent to the touch driver 200 along the second direction DR2. In other words, since the second line parts SSL2 of the sensor lines SSL become denser as they become more adjacent to the touch driver 200 along the second direction DR2, the length of the first line part SSL coupled to the sensor electrode TSE may become shorter as it becomes more adjacent to the touch driver 200.

Because the sensor electrode TSE and the sensor line SSL include a conductive material, the sensor electrode TSE and the sensor line SSL reflect light. Only one first line part SSL1 may be arranged at one side of a sensor electrode TSE located most distant from the touch driver 200. Therefore, there may occur a large variation in reflexibility between the sensor electrode TSE located most distant from the touch driver 200 and a region in which the first line part SSL1 corresponding to the sensor electrode TSE is positioned. In addition, because the number of sensor lines SSL adjacent to a side portion of a sensor electrode TSE and the density of the sensor lines SSL are changed depending on positions of the sensor electrode TSE in the second direction DR2, reflexibilities between sensor electrodes TSE and side portions (e.g., regions in which first line parts SSL1 are disposed) of the sensor electrodes TSE may be different along the second direction DR2. Therefore, a display defect such as a spot may be viewed due to the difference in reflexibility.

The dummy electrodes DE (e.g., DE1, DE2, DE3, ... ) may be arranged to reduce a difference in reflexibility between the touch sensors TSE and peripheral regions thereof.

The dummy electrode DE may be positioned at one side of the sensor electrode TSE, corresponding to the sensor line SSL. The dummy electrode DE may include at least one dummy pattern (designated as UDP1, UDP2, LDP1, and LDP2). In an embodiment, the pattern (e.g., the dummy pattern) of each of the dummy patterns DE may correspond to the shape of the sensor pattern SEP. For example, when the sensor pattern SEP has a rhombus shape, the dummy pattern may have a rhombus shape or have an isosceles triangular shape obtained by cutting the center of a rhombus in the first direction DR1. Thus, the reflexibilities between the sensor electrodes TSE and peripheral regions thereof in the entire touch active region AA can be maintained to similar levels.

In an embodiment, the dummy electrode DE (i.e., the dummy pattern) may be formed by repeatedly patterning a conductive material into a plurality of fine patterns. For example, each side of the rhombus or isosceles triangle of the dummy pattern is not smooth and may have a zigzag shape. Therefore, the dummy pattern may have a mesh shape in which a plurality of openings are defined. Here, the mesh shape may be implemented with a quadrangular pattern, a hexagonal pattern, a circular pattern, or the like. Thus, the opening ratio of the touch active region AA can be increased. However, this is merely illustrative, and the shape and number of dummy patterns are not limited thereto.

The dummy electrode DE may have a transparent conductive material and/or a metal conductive layer. For example, the dummy electrode DE may include at least one selected from the group consisting of molybdenum, silver, titanium, copper, aluminum, and any alloy of two or more thereof. Alternatively, the dummy electrode DE may include a transparent conductive material such as ITO, IZO, ZnO, or ITZO.

The dummy electrode DE may have an electrically floated state. The electrically floated state refers to a state in which the dummy electrode DE is not electrically coupled to other conductive patterns (e.g., the sensor electrode TSE, the sensor line SSL, and the like). For example, the dummy electrode DE may have a predetermined potential (DC voltage value) in the state in which the dummy electrode DE is not electrically coupled to other conductive patterns (e.g., the sensor electrode TSE, the sensor line SSL, and the like). Alternatively, the dummy electrode DE may have a ground potential, or a predetermined constant voltage (DC voltage) may be provided to the dummy electrode DE. Thus, the touch sensitivity or the transfer of a touch signal is not influenced.

In some embodiments, each of the dummy electrodes DE1, DE2, and DE3 may include upper dummy patterns UDP1 and UDP2 disposed at an upper side of the first line part SSL1 and lower dummy patterns LDP1 and LDP2 arranged at a lower side of the first line part SSL, corresponding to the respective upper dummy patterns UDP1 and UDP2.

When the sensor pattern SEP has a rhombus shape, each of the upper dummy patterns UDP1 and UDP2 may correspond to the shape of an isosceles triangle obtained by cutting the center of the sensor pattern SEP in the first direction DR1. In an embodiment, a second upper dummy pattern UDP2 adjacent to a first upper dummy pattern UDP1 may have a shape obtained as the first upper dummy pattern UDP1 is rotated by about 180 degrees. In addition, the lower dummy patterns LDP1 and LDP2 may have shapes symmetrical to those of the upper dummy patterns UDP1 and UDP2 corresponding thereto with respect to the first line part SSL1. For example, a first lower dummy pattern LDP1 may have a shape symmetrical to the first upper dummy pattern UDP1 with respect to the first line part SSL1. The size of the upper dummy patterns UDP1 and UDP2 and the lower dummy patterns LDP1 and LDP2 may be equal to or different from that of an isosceles triangle obtained by cutting the center of the sensor pattern SEP in the first direction DR1.

Meanwhile, in some embodiments, the number of upper dummy patterns UDP1 and UDP2 and the number of lower dummy patterns LDP1 and LDP2 may be decreased as they become more adjacent to the touch driver 200 along the second direction DR2. In an embodiment, the number of upper dummy patterns UDP1 and UDP2 and the number of lower dummy patterns LDP1 and LDP2 may be consecutively decreased or be decreased for every preset distance. For example, as the lengths of the first line parts SSL become shorter in the second direction DR2, the number of upper dummy patterns UDP1 and UDP2 and the number of lower dummy patterns LDP1 and LDP2 may be decreased.

In other words, as the dummy electrode DE becomes more adjacent to the touch driver 200 along the second direction DR2, the size or area of the dummy electrode may be decreased. For example, the size of a second dummy electrode DE2 may be smaller than that of a first dummy electrode DE1, and the size of a third dummy electrode DE3 may be smaller than that of the second dummy electrode DE2.

Because the density of sensor lines SSL becomes higher as they become more adjacent to the touch driver 200 along the second direction DR2, the reflexibility caused by the sensor line SSL may become higher as it becomes more adjacent to the touch driver 200 along the second direction DR2. Thus, although the size of the dummy electrode DE becomes smaller as it becomes more adjacent to the touch driver 200, a variation in reflexibility between the touch electrode TSE and a peripheral region thereof is not increased.

In some embodiments, the size (area) of each of the dummy patterns may be decreased as it becomes more adjacent to the touch driver 200 along the second direction DR2. In addition, distances between the dummy patterns in the first direction DR1 may be different depending on distances between the touch driver 200 and the dummy electrodes DE.

The touch driver 200 may be arranged at one side of the touch active region AA. The touch driver 200 may be electrically coupled to the sensor electrodes TSE through the sensor lines SSL, respectively. The configuration and position of the touch driver 200 have been described with reference to FIGS. 1 and 2, and therefore, their overlapping descriptions will be omitted.

As described above, in the touch sensor according to embodiments of the present disclosure, the dummy electrode having the dummy pattern corresponding to the sensor electrode TSE may be arranged at one side of the sensor electrode TSE, so that it is possible to reduce a difference in reflexibility between the touch electrode TSE and a peripheral region thereof. In addition, the number of dummy patterns (i.e., the size of the dummy electrode DE) may be adjusted based on the length of the second line part SSL2 according to the distance from the touch driver 200 in the second direction DR2, so that the reflexibility of the entire touch active region AA can be uniformly improved. Thus, a display defect such as a spot due to a difference in reflexibility can be prevented.

Figure 4A:
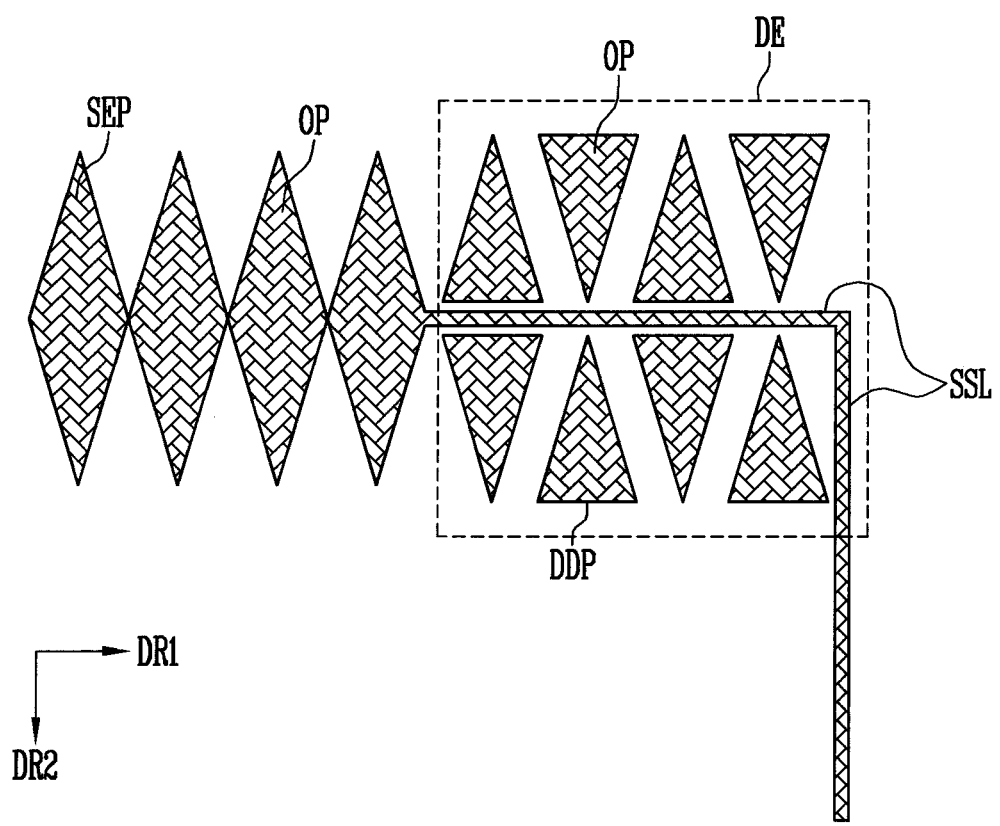
FIG. 4A is a view schematically illustrating an example of electrodes and a sensor line, which are included in the touch sensor of FIG. 3.
Figure 4B:
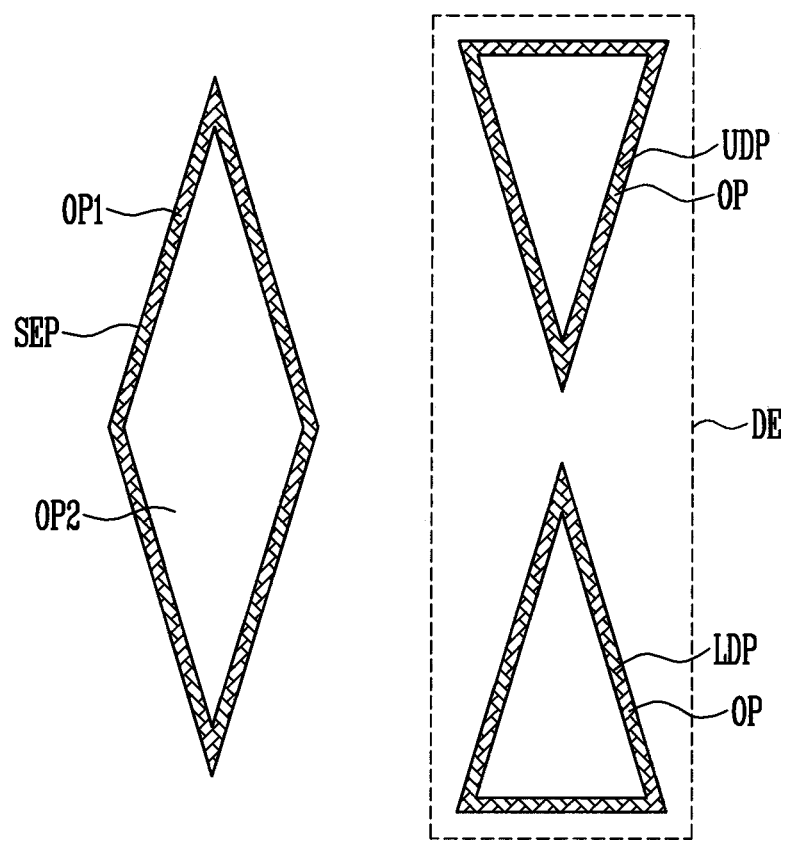
FIG. 4B is a view schematically illustrating an example of the electrodes included in the touch sensor of FIG. 3.

FIG. 4A is a view schematically illustrating an example of the electrodes and the sensor line, which are included in the touch sensor of FIG. 3. FIG. 4B is a view schematically illustrating an example of the electrodes included in the touch sensor of FIG. 3.

Referring to FIGS. 3 to 4B, the sensor pattern, the sensor line, and the dummy pattern may have a mesh shape defined by a plurality of openings OP.

As shown in FIG. 4A, a sensor pattern SEP may have a rhombus shape or a diamond shape. The sensor pattern SEP may be formed by repeatedly patterning a conductive material into a plurality of fine patterns. For example, each side of the rhombus of the sensor pattern is not smooth and may have a zigzag shape. Therefore, the sensor pattern SEP may have a mesh shape in which a plurality of openings OP are defined. The sensor line SSL and the dummy pattern DDP may also be formed by repeatedly patterning a conductive material into a plurality of fine patterns. Each side of the sensor line SSL and the dummy pattern DDP is not smooth and may have a zigzag shape. In FIG. 4A, it is illustrated that the openings OP are provided in a form in which quadrangles are tangled, but the shape of the opening OP is not limited thereto. For example, the opening OP or the mesh shape may be implemented with a hexagonal pattern, a circular pattern, or the like.

Meanwhile, as shown in FIG. 4B, a sensor pattern SEP may have a shape in which only outer sides of a rhombus shape are patterned. That is, the sensor pattern SEP may be formed by repeatedly patterning a conductive material into a plurality of fine patterns along the outer sides of the rhombus shape. Therefore, the sensor pattern SEP may include an opening OP2 having a rhombus shape at the inside thereof. Similarly, each of dummy patterns UDP and LDP may have a shape in which only outer sides of an isosceles triangular shape are patterned. Each side of the sensor pattern SEP and the dummy patterns UDP and LDP is not smooth and may have a zigzag shape.

As described above, the sensor pattern, the sensor line, and the dummy pattern have a mesh shape, so that the opening ratio of the display region of the touch display device can be ensured.

Figure 5A:
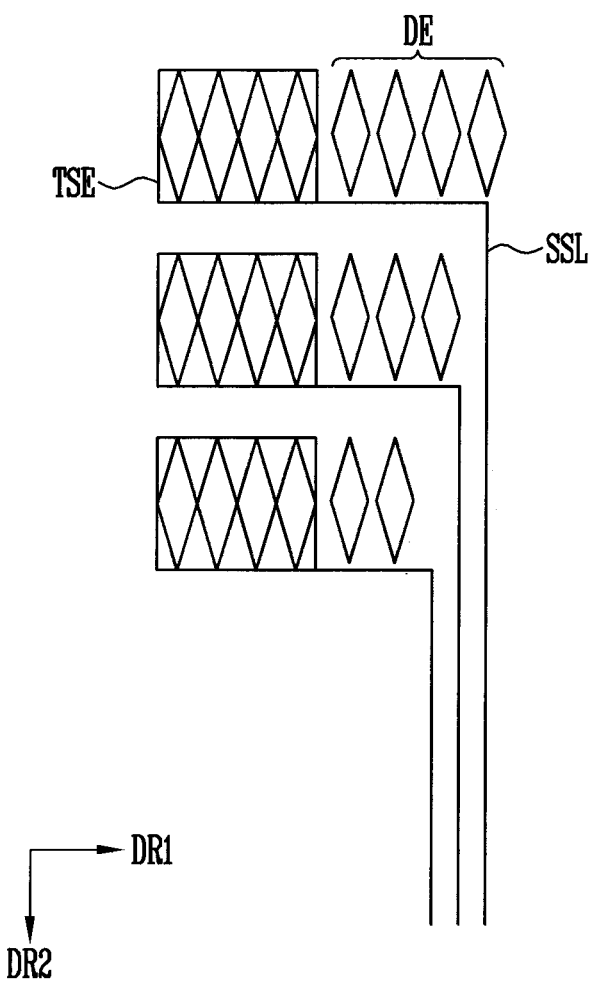
FIGS. 5A and 5B are views schematically illustrating examples of the touch sensor of FIG. 3.
Figure 5B:
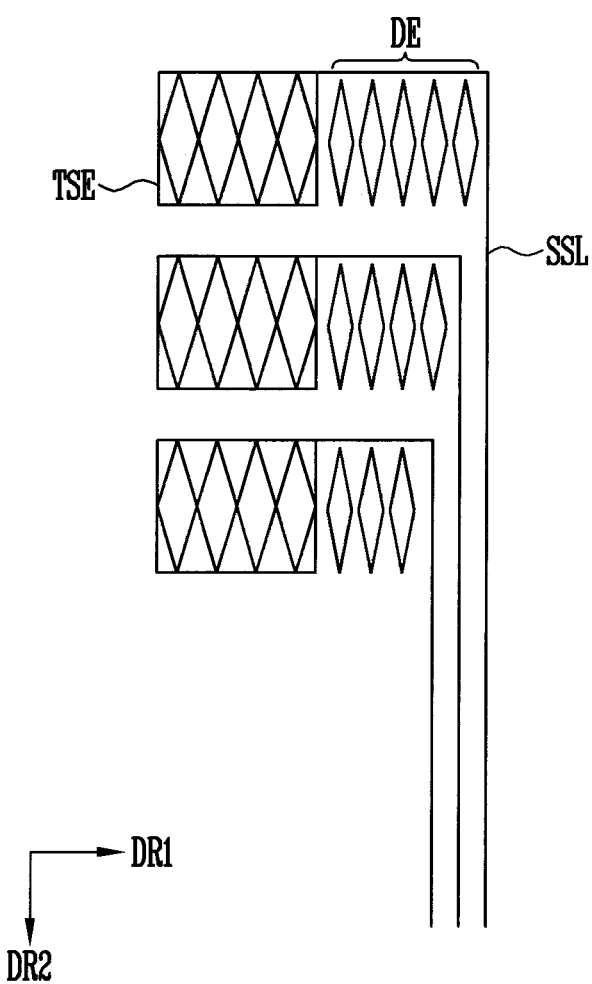

FIGS. 5A and 5B are views schematically illustrating examples of the touch sensor of FIG. 3.

Referring to FIGS. 5A and 5B, a pattern (hereinafter, referred to as a dummy pattern) of each of dummy electrodes DE may correspond to the shape of a sensor pattern constituting a sensor electrode TSE.

In an embodiment, the sensor pattern may have a rhombus shape or a diamond shape. The dummy pattern included in the dummy electrode DE may also have a diamond shape corresponding to the sensor pattern. The size of each dummy pattern may be equal to that of the sensor pattern. However, the size of each dummy pattern may be smaller than that of the sensor pattern depending on the area of a peripheral region of the sensor electrode TSE.

Also, in some embodiments, the size and/or number of dummy patterns may be changed depending on distances from the touch driver along the second direction DR2. For example, the size and/or number of dummy patterns may be decreased as they become more adjacent to the touch driver.

In some embodiments, as shown in FIG. 5A, each sensor line SSL may include a first line part extending in the first direction DR1 from the sensor electrode TSE at a lower side of the dummy pattern and a second line part extending in the second direction DR2 toward the touch driver from one end of the first line part.

Also, in some embodiments, as shown in FIG. 5B, each sensor line SSL may include a first line part extending in the first direction DR1 from the sensor electrode TSE at an upper side of the dummy pattern and a second line part extending in the second direction DR2 toward the touch driver from one end of the first line part.

As described above, in a self-capacitive touch sensor, the dummy patterns having a shape corresponding to the sensor pattern are arranged at one side of the sensor electrode TSE, so that a variation in reflexibility between the sensor electrode TSE and a region adjacent thereto can be reduced. Thus, a display defect such as a spot can be prevented.

Figure 6:
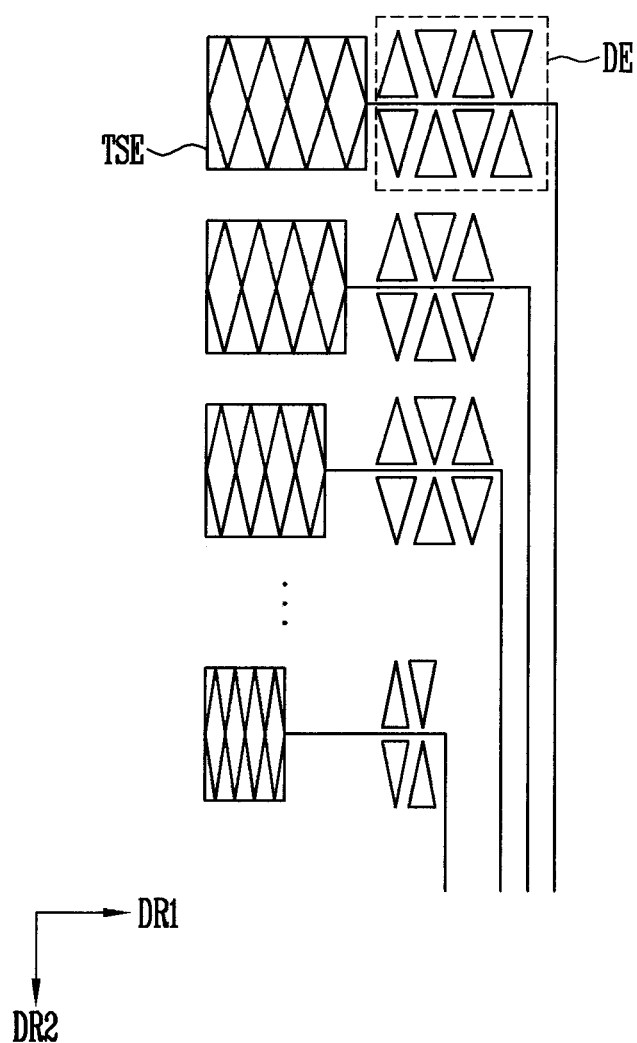
FIG. 6 is a view schematically illustrating another example of the touch sensor of FIG. 3.

FIG. 6 is a view schematically illustrating another example of the touch sensor of FIG. 3.

Referring to FIGS. 3 and 6, the size of the sensor electrodes TSE may become smaller as they become more adjacent to the touch driver 200 along the second direction DR2.

In some embodiments, as the distance from the touch driver 200 becomes shorter, the size and/or number of sensor patterns included in the sensor electrode TSE may be decreased. Therefore, the size of the sensor electrode TSE (i.e., the area occupied by the sensor electrode TSE) may be gradually decreased along the second direction DR2.

In an embodiment, as the size of the sensor electrode TSE is decreased, the size of a dummy electrode corresponding to the sensor electrode TSE may also be decreased. For example, as the distance from the touch driver 200 becomes shorter, the number of upper and lower dummy patterns included in the dummy electrode may be decreased for every interval or preset distance. In an embodiment, as the distance from the touch driver 200 becomes shorter, the size of the upper and lower dummy patterns may be decreased.

Accordingly, the reflexibility of a region in which the sensor electrode TSE is disposed and the reflexibility of a peripheral region in which the first line part SSL1 of the sensor line SSL is disposed can be similarly maintained.

Figure 7:
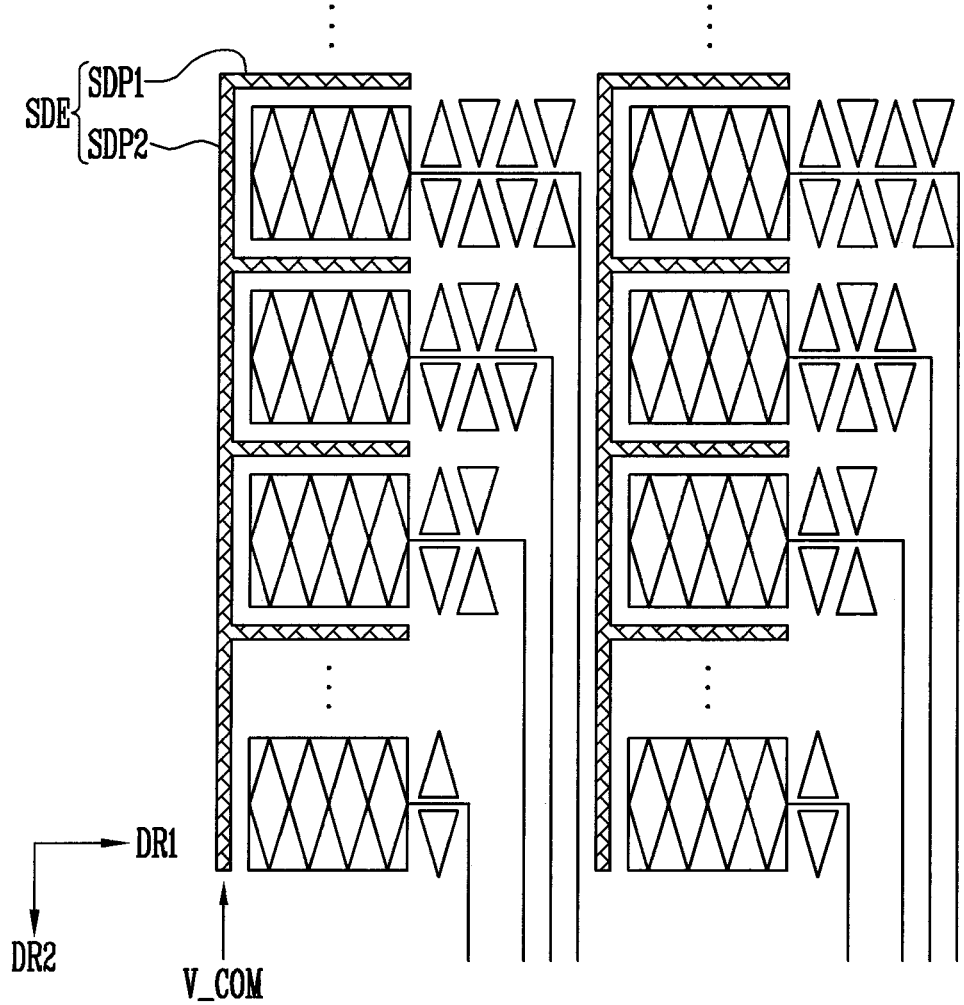
FIG. 7 is a view schematically illustrating still another example of the touch sensor of FIG. 3.

FIG. 7 is a view schematically illustrating still another example of the touch sensor of FIG. 3.

In FIG. 7, components identical to those described with reference to FIG. 3 are designated by like reference numerals, and their overlapping descriptions will be omitted. In addition, the touch sensor of FIG. 7 may have a configuration substantially identical or similar to that of the touch sensor of FIG. 3, except a shielding electrode.

Referring to FIGS. 3 and 7, the touch sensor may include a plurality of sensor electrodes TSE, a plurality of sensor lines SSL, a plurality of dummy electrodes DE, and a touch driver 200. The touch sensor may further include a shielding electrode SDE disposed between the sensor electrodes TSE.

The shielding electrode SDE may include a first shielding pattern SDP1 located between adjacent sensor electrode TSE in the second direction DR2 and a second shielding pattern SDP2 located between adjacent sensor electrodes TSE in the first direction DR1. In an embodiment, the shielding electrode SDE may be provided in a form in which a plurality of first shielding patterns SDP1 are coupled to one second shielding pattern SDP2. Alternatively, a plurality of second shielding patterns SDP2 may be coupled as one at an uppermost side or lowermost side of the touch active region AA.

In an embodiment, the first and second shielding patterns SDP1 and SDP2 may be formed by repeatedly patterning a conductive material into a plurality of fine patterns, and have a mesh shape in which a plurality of openings are defined.

The shielding electrode SDE may block electrical influence between adjacent sensor electrodes TSE. The shielding electrode SDE may include a conductive material. In some embodiments, the conductive material may include a transparent conductive material or a metal alloy.

The shielding electrode SDE may be in an electrically floated state. Alternatively, in some embodiments, a constant voltage V_COM may be applied to the shielding electrode SDE. For example, the constant voltage V_COM may be a common voltage applied to a cathode of each pixel.

Accordingly, it is possible to block electrical influence between the sensor electrodes TSE each having a self-capacitance. Thus, the sensitivity of the touch sensor and the sensing accuracy of the touch sensor can be improved.

Figure 8:
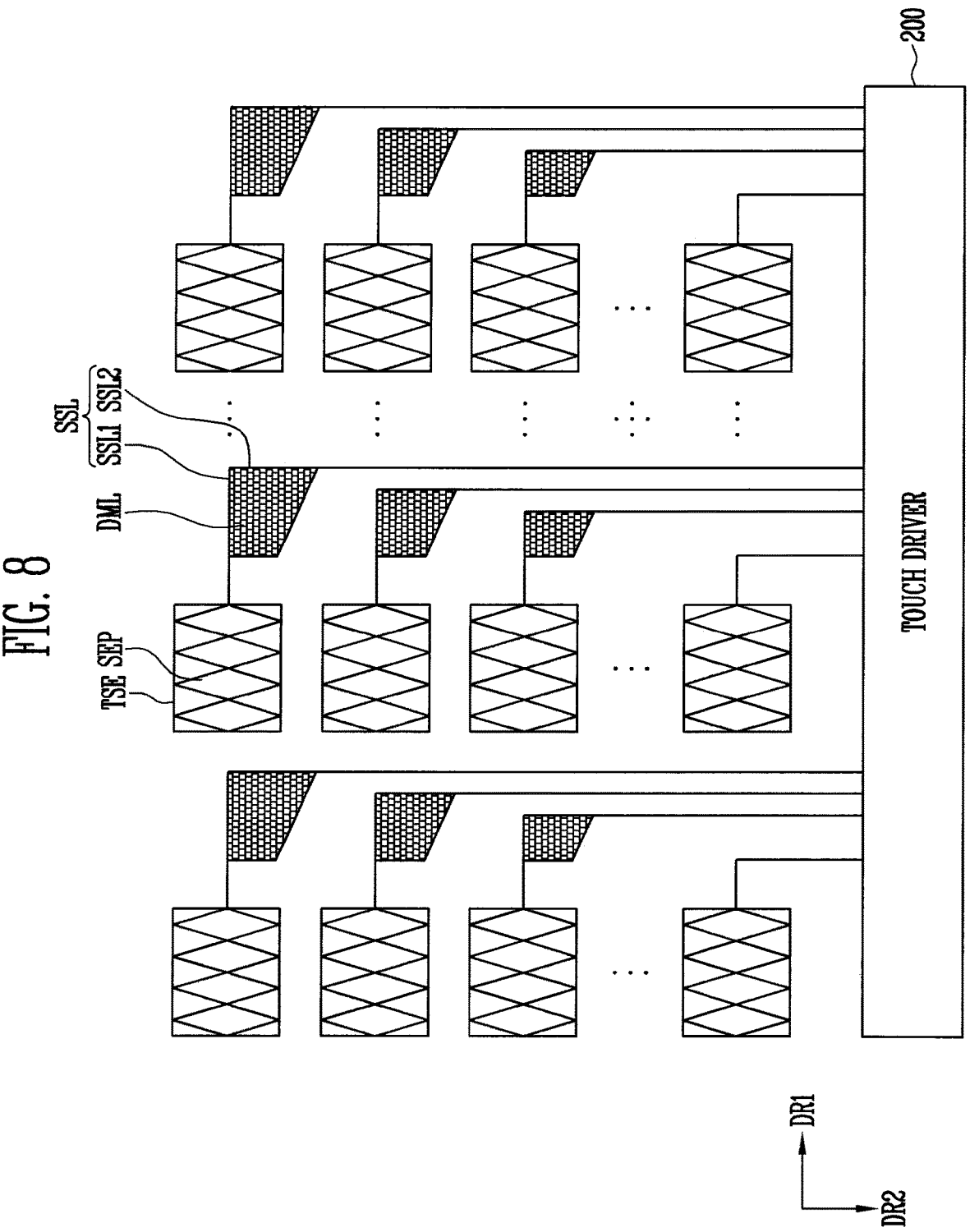
FIG. 8 is a plan view illustrating a touch sensor according to some example embodiments of the present invention.

FIG. 8 is a plan view illustrating a touch sensor according to embodiments of the present disclosure.

In FIG. 8, components identical to those described with reference to FIG. 3 are designated by like reference numerals, and their overlapping descriptions will be omitted. In addition, the touch sensor of FIG. 8 may have a configuration substantially identical or similar to that of the touch sensor of FIG. 3, except dummy electrodes and sensor lines.

Referring to FIGS. 3 and 8, the touch sensor may include a plurality of sensor electrodes TSE, a plurality of sensor lines SSL, and a touch driver 200.

Each of the sensor electrodes TSE may be formed in the touch active region AA as a sensor pattern SEP is repeatedly arranged. In an embodiment, the sensor pattern SEP may have a rhombus shape or a diamond shape. The sensor pattern SEP may be formed by repeatedly patterning a conductive material into a plurality of fine patterns.

The sensor lines SSL may be coupled to the sensor electrodes TSE, respectively. In a self-capacitive touch sensor, the sensor lines SSL may correspond one-to-one to the sensor electrodes TES. The sensor line SSL may electrically couple the sensor electrode TSE to the touch driver 200, and transfer a sensing signal generated from the sensor electrode TSE to the touch driver 200.

In an embodiment, the sensor line SSL may include a first line part SSL1 extending in the first direction DR1 from the sensor electrode TSE, a second line part SSL2 extending in the second direction DR2 from one end of the first line part SSL1 to be coupled to the touch driver 200, and a dummy line part DML coupled between a first point of the first line part SSL1 and a second point of the second line part SSL2. The dummy line part DML may extend to the one end of the first line part SSL1 along the first direction from the predetermined first point of the first line part SSL1. The width of the dummy line part DML in the second direction DR2 may be increased from the first point of the first line part SSL1 to the one end of the first line part SSL1. For example, the dummy line part DML may have a trapezoidal shape of which width in the second direction DR2 is increased. The dummy line part DML may have a triangular shape obtained by coupling the first point of the first line part SSL1 to the second point of the second line part SSL2. In addition, the boundary line of the dummy line part DML, which couples the first point of the first line part SSL1 to the second point of the second line part SSL2, may have a shape concave toward the first line part SSL1 or have a shape convex in the opposite direction. However, in an embodiment, each side (boundary line) of the dummy line part DML is not smooth and may have a zigzag shape. For example, the dummy line part DML may be provided in a mesh shape.

In FIG. 8, it is illustrated that the dummy line part DML is coupled to the first line part SSL1 and the second line part SSL2. However, this is merely illustrative, and the dummy line part DML may not be coupled to at least one of the first line part SSL1 and the second line part SSL2. For example, like the dummy electrode of FIG. 3, the dummy line part DML may be disposed in a floated state.

The dummy line part DML may be positioned corresponding to each of the sensor lines SSL. In some embodiments, as the sensor lines SSL become more adjacent to the touch driver 200 along the second direction DR2, the area of the dummy line part DML corresponding to each of the sensor lines SSL may become smaller.

In other words, the number of sensor lines SSL located at one side of the sensor electrode TSE may be decreased as they become more distant from the touch driver 200. In the embodiment of the present disclosure, the area of the dummy line part DML can be expanded corresponding to the decrease in the number of sensor lines SSL located at one side of the sensor electrode TSE. Accordingly, the difference in reflexibility between the sensor electrode TSE and a peripheral region in which the sensor electrode TSE is located can be reduced, and the visibility of the touch sensor can be improved.

The sensor pattern SEP and the sensor line SSL may be formed in a mesh shape in which a plurality of openings are defined. Specifically, the first line part SSL1, the second line part SSL2, and the dummy line part DML may be formed by repeatedly patterning a conductive material into a plurality of fine patterns. For example, the outer boundary of the first line part SSL1, the second line part SSL2, and the dummy line part DML is not smooth and may have a zigzag shape. In FIG. 8, it is illustrated that the opening of the dummy line part DML has a quadrangular shape, but the shape of the opening is not limited thereto. For example, the opening or the mesh shape may be implemented with a hexagonal pattern, a circular pattern, or the like.

In an embodiment, one side of the dummy line part DML, which is inclined with respect to the first line part SSL1, may have the same slope S for each of the sensor lines SSL. Accordingly, the reflection of irregular light can be minimized, and the visibility of the touch sensor can be improved.

As described above, the area of the dummy line part DML may be changed depending on the number of sensor lines SSL located at one side of the sensor electrode TSE, so that it is possible to reduce the difference in reflexibility between the sensor electrode TSE and a region in which the sensor line disposed at one side of the sensor electrode TSE. Further, the reflexibility of the entire touch active region AA can be uniformly improved. Accordingly, a display defect such as a spot due to a difference in reflexibility can be prevented.

Figure 9:
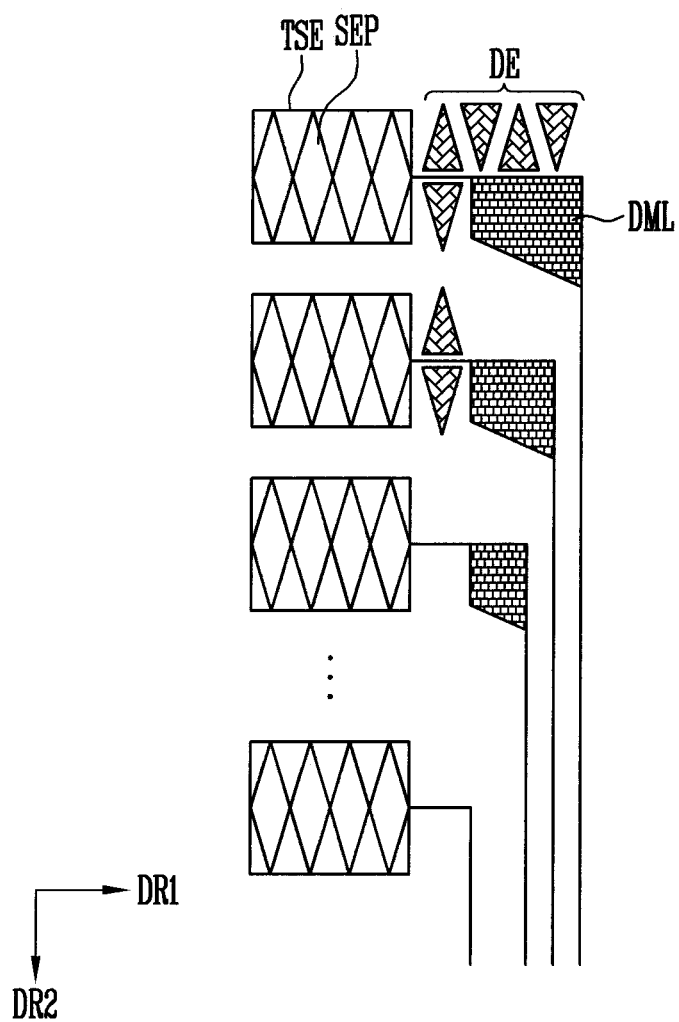
FIG. 9 is a view schematically illustrating an example of the touch sensor of FIG. 8.

FIG. 9 is a view schematically illustrating an example of the touch sensor of FIG. 8.

In FIG. 9, components identical to those described with reference to FIGS. 3 and 8 are designated by like reference numerals, and their overlapping descriptions will be omitted.

Referring to FIGS. 3, 8, and 9, the touch sensor may include a plurality of sensor electrodes TSE, a plurality of sensor lines SSL, a plurality of dummy electrode DE, and a touch driver 200.

In some embodiments, the dummy electrode DE may be additionally disposed in a region in which a dummy line part DML is not arranged at the first line part SSL1 of the sensor line SSL. The dummy electrode DE may include at least one dummy pattern. For example, when a sensor pattern SEP has a rhombus shape, the dummy pattern may have a rhombus shape or have an isosceles triangular shape obtained by cutting the center of the rhombus in the first direction DR1. Thus, the reflexibilities between the sensor electrodes TSE and peripheral regions thereof can be maintained to similar levels.

In an embodiment, the number and/or size of dummy patterns may be decreased as they become more adjacent to the touch driver 200 along the second direction DR2.

Figure 10:
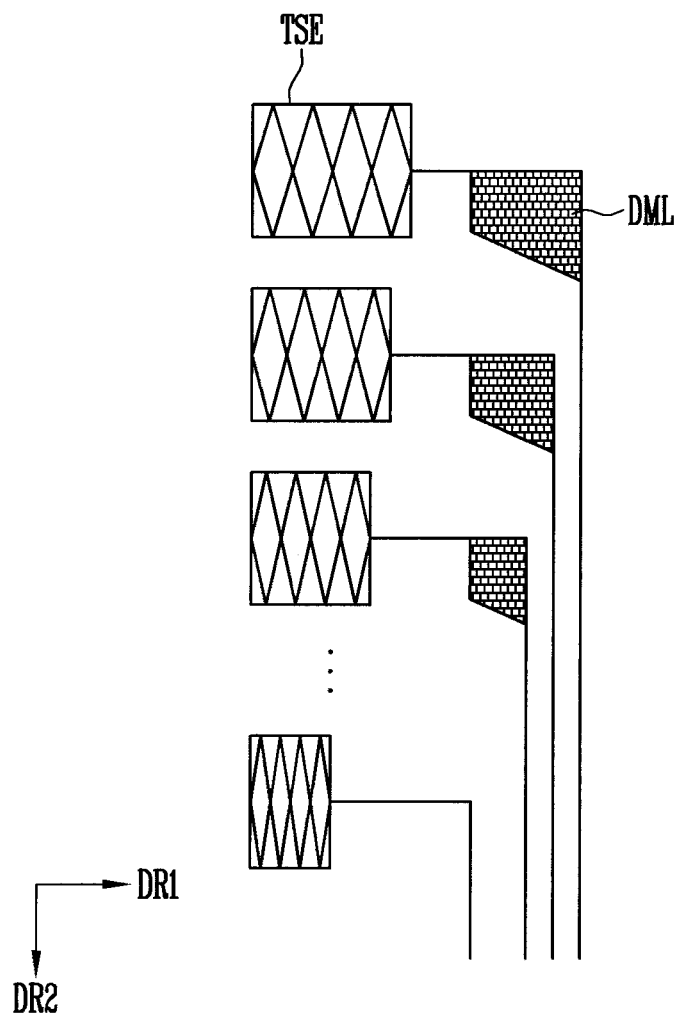
FIG. 10 is a view schematically illustrating an example of the touch sensor of FIG. 8.

FIG. 10 is a view schematically illustrating an example of the touch sensor of FIG. 8.

In FIG. 10, components identical to those described with reference to FIG. 8 are designated by like reference numerals, and their overlapping descriptions will be omitted.

Referring to FIGS. 8 and 10, the size of the sensor electrodes TSE may become smaller as they become more adjacent to the touch driver 200 along the second direction DR2.

In some embodiments, the size and/or number of sensor patterns included in the sensor electrode TSE may be decreased as the distance from the touch driver 200 becomes shorter. Accordingly, the size of the sensor electrode TSE (i.e., the area occupied by the sensor electrode TSE) can be gradually decreased along the second direction DR2.

In an embodiment, as the sensor electrode TSE may be decreased, the size of the dummy line part DML corresponding to the sensor electrode TSE may also be decreased.

Accordingly, the reflexibility of a region in which the sensor electrode TSE may be disposed and the reflexibility of a peripheral region of the sensor electrode TSE can be similarly maintained.

Figure 11:
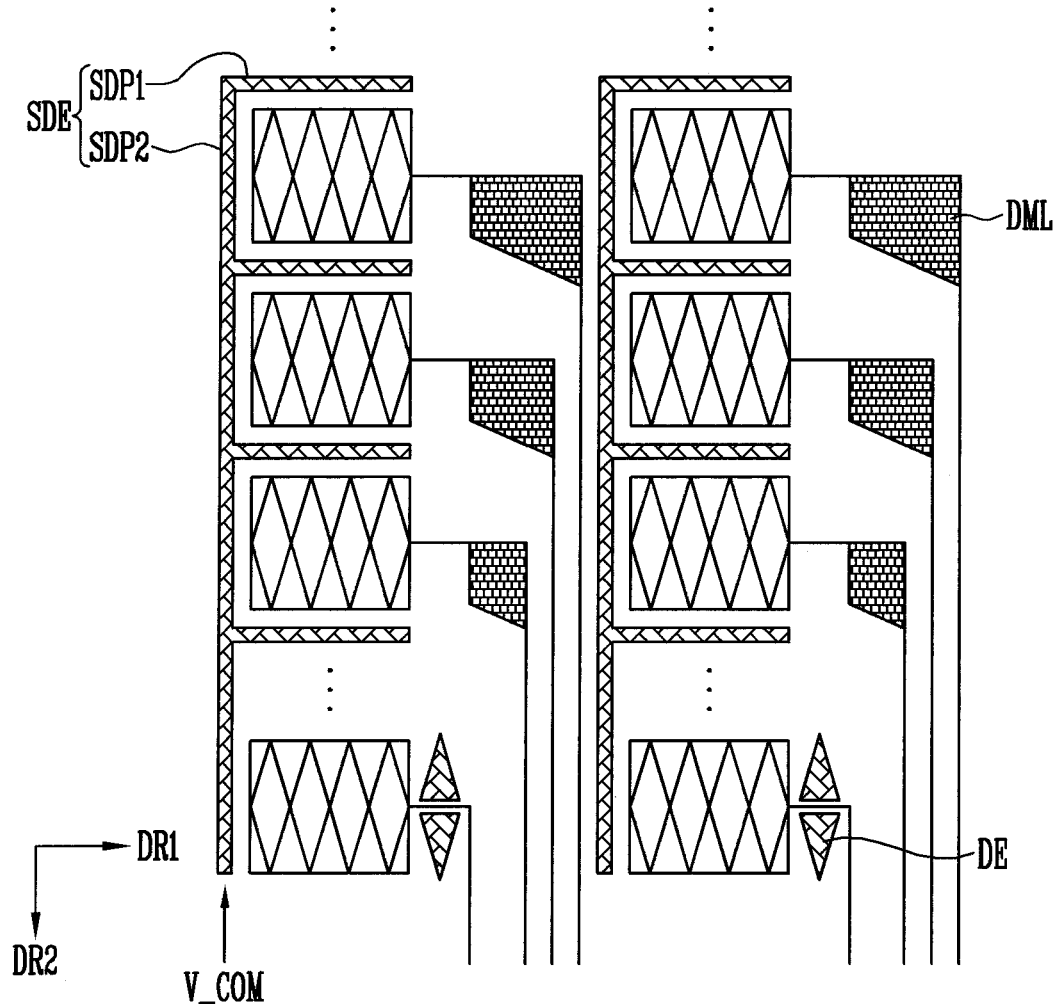
FIG. 11 is a view schematically illustrating an example of the touch sensor of FIG. 8.

FIG. 11 is a view schematically illustrating an example of the touch sensor of FIG. 8.

In FIG. 11, components identical to those described with reference to FIGS. 7 and 8 are designated by like reference numerals, and their overlapping descriptions will be omitted.

Referring to FIGS. 7, 8, and 11, the touch sensor may include a plurality of sensor electrodes TSE, a plurality of sensor lines SSL, and a touch driver 200. The touch sensor may further include a dummy electrode and/or a shielding electrode SDE.

The shielding electrode SDE may include a first shielding pattern SDP1 located between adjacent sensor electrodes TSE in the second direction DR2 and a second shielding pattern SDP2 located between adjacent sensor electrodes TSE in the first direction DR1.

In an embodiment, the first and second shielding patterns SDP1 and SDP2 may be formed by repeatedly patterning a conductive material into a plurality of fine patterns, and have a mesh shape in which a plurality of openings are defined.

The shielding electrode SDE may block electrical influence between adjacent sensor electrodes TSE. The shielding electrode SDE may be in an electrically floated state. Alternatively, in some embodiments, a constant voltage V_COM may be applied to the shielding electrode SDE. For example, the constant voltage V_COM may be a common voltage applied to a cathode of each pixel.

Accordingly, it is possible to block electrical influence between the sensor electrodes TSE each having a self-capacitance. Thus, the sensitivity of the touch sensor and the sensing accuracy of the touch sensor can be improved.

As described above, in the touch sensor and the touch display device including the same according to the embodiments of the present disclosure, the area (or size) of at least one of the dummy electrode and the dummy line, which are arranged at one side of the sensor electrode may be changed depending on the distance from the touch driver 200, so that the difference in reflexibility between the sensor electrode and a peripheral region thereof can be reduced. Thus, the reflexibilities between the sensor electrodes and peripheral regions thereof can be maintained to similar levels. Accordingly, a display defect such as a spot due to a difference in reflexibility in the touch active region can be prevented or reduced, and the visibility of the touch sensor can be improved.

Aspects of some example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims, and their equivalents.

What is claimed is:

1. A touch sensor comprising:
a plurality of sensor electrodes arranged in rows and columns and formed in a touch active region to form a plurality of sensor patterns;
a plurality of sensor lines electrically and physically connected to the respective sensor electrodes;
a touch driver at one side of the touch active region, the touch driver being electrically coupled to the sensor electrodes respectively through the sensor lines; and
dummy electrodes respectively arranged at one side of each of the columns of the sensor electrodes, corresponding to the sensor lines,
wherein each of the sensor lines includes a first line part extending in a first direction from each of the sensor electrodes, wherein each of the dummy electrodes includes a plurality of dummy patterns disposed symmetrically on both sides of the first line part,
wherein the plurality of sensor electrodes do not overlap each other in a thickness direction,
wherein the plurality of dummy patterns include upper dummy patterns at an upper side of the first line part and lower dummy patterns at a lower side of the first line part, corresponding to the respective upper dummy patterns, and
wherein the upper dummy pattern corresponds to a shape obtained by cutting a center of the sensor pattern in the first direction, and the lower dummy pattern has a shape symmetrical to the upper dummy pattern corresponding to the lower dummy pattern with respect to the first line part.

2. The touch sensor of claim 1, wherein each of the dummy electrodes has a pattern corresponding to a shape of a corresponding sensor pattern.

3. The touch sensor of claim 1, wherein each of the sensor lines further includes:
a second line part extending in a second direction, perpendicular to the first direction, from one end of the first line part to the touch driver,
wherein a length of the first line part becomes shorter as the first line part becomes more adjacent to the touch driver along the second direction.

4. The touch sensor of claim 3, wherein the dummy electrodes are configured with at least one dummy pattern at at least one of the upper and lower sides of the first line part.

5. The touch sensor of claim 4, wherein the sensor patterns have a rhombus shape.

6. The touch sensor of claim 5, wherein the upper dummy patterns correspond to an isosceles triangular shape obtained by cutting a center of the sensor patterns in the first direction, and
wherein a second upper dummy pattern adjacent to a first upper dummy pattern has a shape obtained as the first upper dummy pattern is rotated by 180 degrees.

7. The touch sensor of claim 5, wherein a number of upper dummy patterns and lower dummy patterns is decreased for every preset distance as the upper dummy patterns and the lower dummy patterns become more adjacent to the touch driver along the second direction.

8. The touch sensor of claim 3, wherein sizes of the sensor electrodes becomes smaller as the sensor electrodes become more adjacent to the touch driver along the second direction.

9. The touch sensor of claim 8, wherein a size of the sensor patterns become smaller as the sensor patterns become more adjacent to the touch driver along the second direction.

10. The touch sensor of claim 1, wherein the sensor patterns and the sensor lines are formed by repeatedly patterning a conductive material into a plurality of fine patterns.

11. The touch sensor of claim 10, wherein the sensor patterns and the sensor lines comprise a transparent conductive material.

12. The touch sensor of claim 10, wherein the sensor patterns and the sensor lines have a mesh shape comprising a plurality of openings.

13. The touch sensor of claim 1, further comprising:
a shielding electrode between the sensor electrodes, the shielding electrode blocking electrical influence between adjacent sensor electrodes.

14. The touch sensor of claim 13, wherein the shielding electrode includes a conductive material, and
wherein a constant voltage is applied to the shielding electrode, or the shielding electrode has a floated state.

15. A touch display device comprising:
a touch sensor configured to recognize a touch, based on a touch capacitance generated by an approach or touch of a touch object; and
a display panel combined with the touch sensor,
wherein the touch sensor includes:
a plurality of sensor electrodes arranged in rows and columns in a touch active region to form a plurality of sensor patterns;
a plurality of sensor lines electrically and physically connected to the respective sensor electrodes;
a touch driver at one side of the touch active region, the touch driver being electrically coupled to the sensor electrodes respectively through the sensor lines; and
a dummy electrode including a plurality of dummy patterns respectively arranged at one side of each of the columns of the sensor electrodes, corresponding to the sensor lines,
wherein each of the sensor lines includes a first line part extending in a first direction from each of the sensor electrodes,
wherein each of the dummy patterns is disposed symmetrically on both sides of the first line part,
wherein a number of dummy patterns is decreased as the dummy patterns become more adjacent to the touch driver,
wherein the plurality of sensor electrodes do not overlap each other in a thickness direction,
wherein the plurality of dummy patterns include upper dummy patterns at an upper side of the first line part and lower dummy patterns at a lower side of the first line part, corresponding to the respective upper dummy patterns, and
wherein the upper dummy pattern corresponds to a shape obtained by cutting a center of the sensor pattern in the first direction, and the lower dummy pattern has a shape symmetrical to the upper dummy pattern corresponding to the lower dummy pattern with respect to the first line part.

* * * * *